Jan. 30, 1951 J. BERNIER 2,539,985
VELOCITY MODULATION ELECTRON DISCHARGE
DEVICE OF HIGH POWER
Filed April 23, 1946 3 Sheets-Sheet 1

Inventor
JEAN BERNIER
By
Haseltine, Lake & Co.
Attorneys

Jan. 30, 1951 J. BERNIER 2,539,985
VELOCITY MODULATION ELECTRON DISCHARGE
DEVICE OF HIGH POWER
Filed April 23, 1946 3 Sheets-Sheet 2

Inventor
JEAN BERNIER
By Haseltine, Lake & Co.
Attorneys

Jan. 30, 1951  J. BERNIER  2,539,985
VELOCITY MODULATION ELECTRON DISCHARGE
DEVICE OF HIGH POWER

Filed April 23, 1946  3 Sheets-Sheet 3

Inventor
JEAN BERNIER
By Haseltine, Lake & Co.
Attorneys

Patented Jan. 30, 1951

2,539,985

UNITED STATES PATENT OFFICE 2,539,985

VELOCITY MODULATION ELECTRON DISCHARGE DEVICE OF HIGH POWER

Jean Bernier, Paris, France, assignor to Compagnie Generale de Telegraphie Sans Fil, a corporation of France Application April 23, 1946, Serial No. 664,156
In France September 15, 1944

Section 1, Public Law 690, August 8, 1946
Patent expires September 15, 1964

5 Claims. (Cl. 315—6)

This invention relates to velocity modulation electron discharge devices of high power.

Generators best adapted for the production of decimetric or centimetric waves comprise velocity modulation tubes which include tubes of the Klystron type.

The present invention has for an object the provision of a velocity modulation tube possessing, from the point of view of power, the advantages of placing $n$ valves in parallel but devoid of the drawbacks of such an arrangement. This is achieved according to the present invention by designing a cavity resonator of special shape.

According to the present invention there is provided a valve wherein $n$ distinct beams traverse two cavities (the buncher and the catcher) of similar design and of such a shape that the distance between the walls is slight at the vicinity of the beams and the high frequency electric energy is especially localised at the $n$ points of passage. This tube functions according to the well-known principles of velocity modulation tubes of the Klystron type.

The foregoing and other objects and the invention will be better understood when read in connection with the following detail description and the accompanying drawings, in which:

Figure 5b is an electric field force diagram of the resonator of Figure 5a;

Figure 1:
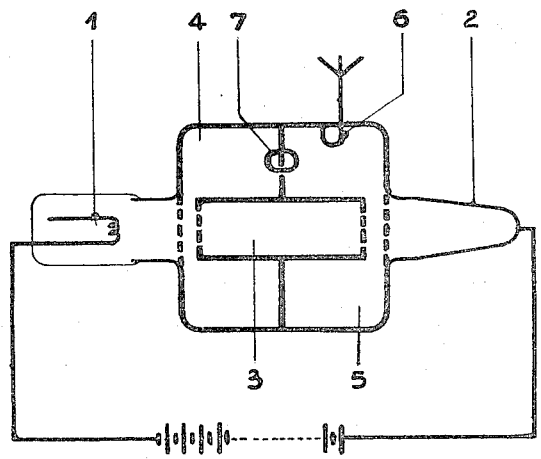
Figure 1 is a diagrammatic view of one example of a Klystron tube.

Referring to Fig. 1, the Klystron tube here shown comprises an appendix housing a cathode 1, an anode 2, a drift tube 3, an input cavity 4 operating as a buncher, an output cavity 5 operating as a catcher and coupling members (loops) 6 and 7 which couple the collector with the utilization load and the collector with the buncher. Klystrons are essentially built up of two cavities of revolution traversed along their common axis by an electronic beam. The mean transit angle of the beam through the electric fields of ultra-high frequency of each of the two cavities having to be small, according to the theory of these tubes, the distance which separates the walls of the cavities must be slight in the vicinity of their axis, so that their profile has necessarily a re-entrant form. The inventors of the Klystron have termed such cavities of revolution "rhumbatrons."

With the Klystron tube of the original model, there can be at present obtained useful powers of the order of the kilowatt (at a continuous rate) on a wave length of twenty centimetres with an efficiency in the neighbourhood of 30%. These results although very interesting are nevertheless insufficient for certain applications and other means have already been contemplated for their improvement. It might have been thought that the employment of beams of larger diameter and greater intensity would effect the necessary improvement, but the effects of the space charge in the high frequency fields and the deformation of these fields by the grids of the rhumbatrons, become important; and further as the capacity of the oscillating circuit increases with the construction, the self-induction diminishes and thus at the same time the quality of the circuits and the efficiency of conversion of the tube diminish rapidly.

Figure 2A:
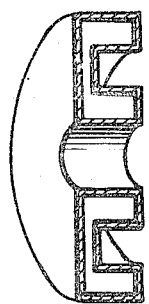
Figures 2a and 2b show sectional views of two previously proposed forms of cavity resonators cooperating with certain types of beam.

In order to be able to increase to a large extent the intensity of the beam without introducing certain of the drawbacks referred to above, it has already been suggested to employ beams in the form of a hollow cylinder, or in the form of a flat slab, associated with cavities obtained by rotation of the incurve profile of the rhumbatrons about an axis of its plane (that is, the axis of the beam), but externally of the contour, and, according to circumstances, either parallel or perpendicular to the symmetrical axis of the profile. Such an arrangement is diagrammatically illustrated in Figures 2a and 2b. In the arrangement illustrated in Figure 2a, the cathode would be of ring form, whereas in accordance with the arrangement illustrated in Figure 2b, the cathode would be cylindrical. But in such oscillating circuits, the capacitative part considerably increases and the resistance $r$ decreases, roughly in proportion to the surface of the walls; whilst the inductance $L\omega$ which is inversely proportional to $C\omega$, is diminished. It follows that the $Q=L\omega/r$ quality of the circuit is considerably diminished.

Another known means of obtaining a powerful generator consists in coupling together a number of identical tubes. If W is the power furnished by each independent tube and if $n$ valves are coupled together, the power of the generator would be of the order of but less than $nW$. The degree less is controlled by the theory of coupled circuits, but by making $n$ sufficiently large any desired power can be attained. This, however, necessitates a tuning in frequency and in phase of each of the tubes, which leads, in particular for tube of the Klystron type, to the adjustment of $2n$ cavities, so that the process becomes rapidly impracticable.

Observing that the modes of vibration of the cavities of the same group are identical and that the lines of force of the electric field are normal to the dividing walls, which are at the same time planes of symmetry, these common walls can be dispensed with without modifying the vibratory state of the cavities. There is thus obtained the tube diagrammatically represented in Figures 4a and 4b constituted by four distinct electronic beams, cylindrical and parallel, traversing two cavities of the same design, one acting as a buncher and the other as a collector. Figure 5a represents a view in perspective of a cavity the principle of which forms one of the objects of the invention, and Figure 5b is a sectional view. On this latter there are shown furthermore in fine lines, the lines of force of the electric field; the electric energy of the cavity is chiefly localised in the only regions where the walls are at a slight distance apart, which regions are distinct from each other and are those which the beams traverse.

Figure 2B:
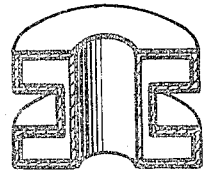
Figure 6:
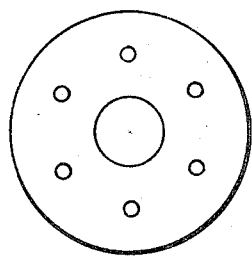
Figures 6 and 7 are diagrammatic end elevations showing further modified construction.
Figure 7:
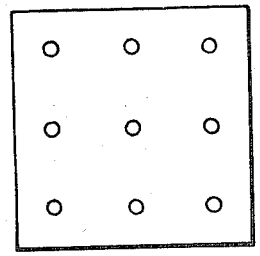
Figure 8A:
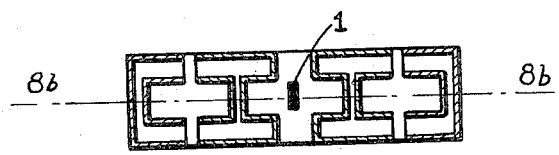
Figures 8a and 8b are sectional views of further modifications of structure according to the invention.
Figure 8B:
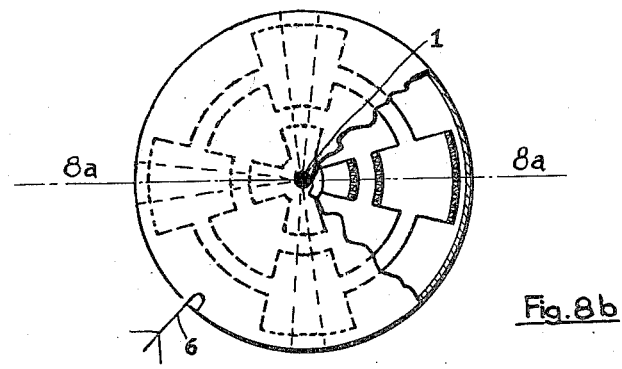

It is not essential for the object of the invention for the $n$ beams to be arranged in line, nor that they be cylindrical and parallel. The expert can think of many modifications of form. Thus, Figure 6 represents a ring arrangement seen from the end and which is particularly advantageous as to construction; in the same way Figure 7 represents a chessboard arrangement; finally, Figures 8a and 8b represent a star arrangement with four conical beams seen in elevation and in plan and in which the assembler cavity and the collector cavity have no common walls; the cathode I is central and is the source of electronic beams radicating from the centre. The high frequency coupling loop 6 is similar to that of the modification of Figure 1. Figures 8a and 8b demonstrate clearly the difference of design of the present tube from that mentioned at the outset and where the beam is in the form of a flat slab and the cavities created by the rhumbatron profile rotate about the axis of the beam, the axis being perpendicular to the axis of symmetry of the profile and external of the latter, as shown by Figure 2b.

The advantages of the tube forming the object of the present invention are in particular as follows:

(1) The power of the tube increases proportionally with the number of the beams, which is not limited;

(2) The tube comprises only two cavities; operating for example as an auto-oscillator, a single coupling member between the two cavities and a single coupling member of the load with the collector will be sufficient.

Figure 3A:
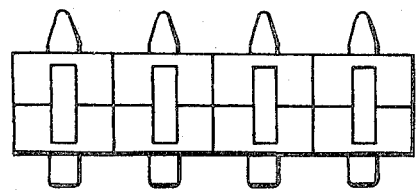
Figures 3a and 3b show diagrammatically plan and elevation views of four identical Klystrons placed side by side.
Figure 3B:
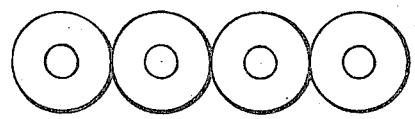
Figure 3C:
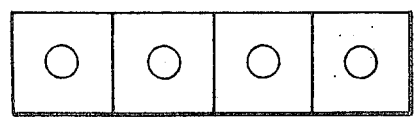
Figure 3c shows diagrammatically in end elevations modifications of the construction illustrated in Figures 3a and 3b.

(3) The frequency adjustment of each of the cavities takes place by deformation of the wall or by the insertion of a piston, according to usual practice; thus, two of these regulating members will be sufficient, whereas two $n$ of them will be necessary if $n$ Klystrons are placed in parallel;

(4) The quality of the cavities forming the object of the invention, as an oscillating circuit, is superior to that of the rhumbatrons from which they are derived, and this quality increases as the number $n$ of beams increases. If, in fact Figures 3c and 4b, are referred to, it will be noticed that by omitting the central walls of the elementary cavities, the Joule effect losses in these walls are, ipso facto, suppressed, without modifying the inductance or the capacity of the circuit equivalent to each of these elementary cavities from the point of view of the beams; their quality will consequently be improved;

(5) The coupling between a loop and the cavity forming the object of the invention is $n$ times smaller than the coupling between the same loop similarly placed with one of the elementary cavities by which the resulting cavity is constituted. This advantage is important, because a weak coupling between the collector and the buncher is a well-known necessary condition of good efficiency in Klystrons, but for this coupling to be weak is technically difficult to accomplish.

Figure 4A:
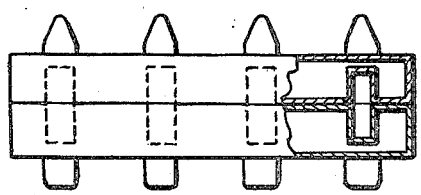
Figures 4a and 4b are respectively partly plan and partly section and elevation views illustrating a modified construction of that shown in Figures 3a and 3b which embodies a characteristic feature of the present invention.
Figure 5A:
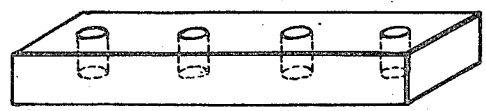
Figure 5a is a perspective and diagrammatic view of a single cavity resonator.
Figure 4B:
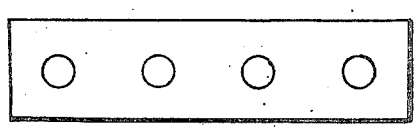
Figure 5B:
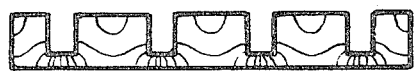

The principle of the invention extends to tubes with a "single cavity" derived from single cavity Klystrons and which would be obtained by doing away with, for example, in Figure 4a, the central wall between the buncher cavity and the collector cavity. It also extends to reflex tubes derived from reflex Klystrons, in which the same high frequency field acts as a buncher field and collector field at the same time.

It will be understood that further modifications and adaptations may be made without departure from the principles of the invention. Hence I claim all such modifications and adaptations as may fall fairly within the spirit and scope of the hereinafter appended claims.

What I claim is:

1. A velocity modulation device comprising at least one cavity resonator having a plurality of re-entrant portions, means comprising at least one electron source for generating a plurality of distinct and separate electron beams each traversing respectively one of said re-entrant portions, and means for injecting into said cavity resonator ultra-high frequency energy at a frequency corresponding to that of a concentration of the electrical field component of said ultra-high frequency energy in the spaces inside said resonators near said re-entrant portions.

2. A velocity modulation device comprising an input circuit and an output circuit coupled with an ultra-high frequency circuit, wherein each of said input and output circuits is constituted by a cavity resonator as claimed in claim 1.

3. A velocity modulation device comprising at least one cavity resonator having a plurality of re-entrant portions, means comprising at least one electron source for generating a plurality of distinct and separate electron beams each traversing respectively one of said re-entrant portions, whereby the frequency of the energy of a given ultra-high frequency injected into said cavity resonator corresponds to that of a concentration of the electrical field component of said given frequency in the spaces inside said resonators near said re-entrant portions.

4. A velocity modulation device as claimed in claim 2, wherein the input and output resonant circuits are placed so that their opposing walls are in contact one with the other to form a wall common to the two circuits.

5. A velocity modulation device as claimed in claim 2, wherein the input and output resonant circuits are ring shaped and are disposed coaxially, one surrounding the other, the re-entrant portions of each circuit being aligned radially with respect to the ring center and being traversed by electron beams emitted from a cathode situated at the center of the device.

JEAN BERNIER.

REFERENCES CITED

The following references are of record in the file of this patent:

UNITED STATES PATENTS

| Number    | Name     | Date           |
|-----------|----------|----------------|
| 2,250,698 | Berline  | July 29, 1941  |
| 2,284,405 | McArthur | May 26, 1942   |
| 2,320,860 | Fremlin  | June 1, 1943   |
| 2,381,320 | Tawney   | Aug. 7, 1945   |
| 2,407,667 | Kircher  | Sept. 17, 1946 |
| 2,408,409 | Bowen    | Oct. 1, 1946   |
| 2,416,283 | Bowen    | Feb. 25, 1947  |